United States Patent
Zhang et al.

(10) Patent No.: US 10,521,059 B2
(45) Date of Patent: Dec. 31, 2019

(54) TOUCH PANEL, MUTUAL CAPACITIVE TOUCH SCREEN, AND TOUCH DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Xujie Zhang, Beijing (CN); Ming Zhang, Beijing (CN); Xiaodong Xie, Beijing (CN); Jing Wang, Beijing (CN); Jian Tian, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei (CN)

( * ) Notice: Subject to any disclaimer, the term of this patent is extended or adjusted under 35 U.S.C. 154(b) by 21 days.

(21) Appl. No.: 15/763,567

(22) PCT Filed: Oct. 9, 2017

(86) PCT No.: PCT/CN2017/105355
§ 371 (c)(1),
(2) Date: Mar. 27, 2018

(87) PCT Pub. No.: WO2018/166189
PCT Pub. Date: Sep. 20, 2018

(65) Prior Publication Data
US 2019/0050076 A1    Feb. 14, 2019

(30) Foreign Application Priority Data

Mar. 15, 2017  (CN) .......................... 2017 1 0153010

(51) Int. Cl.
*G06F 3/044* (2006.01)

(52) U.S. Cl.
CPC .... *G06F 3/044* (2013.01); *G06F 2203/04103* (2013.01); *G06F 2203/04111* (2013.01)

(58) Field of Classification Search
CPC ......... G06F 3/044–0448; G06F 3/0412; G06F 3/041
See application file for complete search history.

(56) References Cited

U.S. PATENT DOCUMENTS

| | | | |
|---|---|---|---|
| 10,310,688 B2 * | 6/2019 | Xie .......................... | G06F 3/044 |
| 2012/0127387 A1 * | 5/2012 | Yamato ................... | G06F 3/044 349/42 |

(Continued)

FOREIGN PATENT DOCUMENTS

| | | |
|---|---|---|
| CN | 103150070 A | 6/2013 |
| CN | 104049821 A | 9/2014 |

(Continued)

OTHER PUBLICATIONS

English translation of International Search Report dated Jan. 12, 2018, issued in counterpart International Application No. PCT/CN2017/105355 (13 pages).

(Continued)

*Primary Examiner* — Sanjiv D. Patel
(74) *Attorney, Agent, or Firm* — Westerman, Hattori, Daniels & Adrian, LLP

(57) ABSTRACT

A touch panel includes a substrate, a first touch electrode disposed over the substrate and including a first sub-electrode and a second sub-electrode electrically coupled to each other, and a second touch electrode disposed over the substrate and intersecting the first touch electrode. The first sub-electrode and the second sub-electrode are arranged in an extension direction of the first touch electrode. The first sub-electrode includes a first strip-shaped electrode. The second sub-electrode includes a second strip-shaped electrode. An angle between an extension direction of the first (Continued)

strip-shaped electrode and an extension direction of the second strip-shaped electrode is non-zero.

14 Claims, 10 Drawing Sheets

(56) References Cited

U.S. PATENT DOCUMENTS

| | | | | |
|---|---|---|---|---|
| 2013/0016363 | A1* | 1/2013 | Iwamoto | G06F 3/044 |
| | | | | 356/616 |
| 2014/0333570 | A1* | 11/2014 | Lesonen | G06F 3/044 |
| | | | | 345/174 |
| 2015/0029118 | A1 | 1/2015 | Xu et al. | |
| 2016/0077645 | A1* | 3/2016 | Chien | G06F 3/0412 |
| | | | | 349/12 |
| 2016/0252996 | A1* | 9/2016 | Jiang | G02F 1/134336 |
| | | | | 345/174 |
| 2016/0370920 | A1 | 12/2016 | Fan et al. | |
| 2017/0102820 | A1 | 4/2017 | Yu et al. | |
| 2017/0115770 | A1* | 4/2017 | Han | G06F 3/044 |
| 2017/0147133 | A1* | 5/2017 | Choi | G06F 3/044 |

FOREIGN PATENT DOCUMENTS

| | | |
|---|---|---|
| CN | 104199586 A | 12/2014 |
| CN | 104536634 A | 4/2015 |
| CN | 205486028 U | 8/2016 |
| CN | 106293231 A | 1/2017 |
| JP | 2013069261 A | 4/2013 |
| JP | 2014203664 A | 10/2014 |

OTHER PUBLICATIONS

Office Action dated Oct. 25, 2019, issued in counterpart CN application No. 201710153010.2, with English translation. (20 pages).

* cited by examiner

US 10,521,059 B2

TOUCH PANEL, MUTUAL CAPACITIVE TOUCH SCREEN, AND TOUCH DISPLAY DEVICE

CROSS-REFERENCE TO RELATED APPLICATION

This PCT patent application claims priority to Chinese Patent Application No. 201710153010.2, filed on Mar. 15, 2017, the entire contents of which are incorporated herein by reference.

TECHNICAL FIELD

The present disclosure generally relates to the field of display technologies and, more particularly, to a touch panel, a mutual capacitive touch screen, and a touch display device.

BACKGROUND

Touch screens are adopted in products such as mobile phones, tablet computers. Using touch-control method in products is a major future trend. Mutual capacitive touch screens improve efficiency and convenience of human-computer interaction. A mutual capacitive touch screen includes touch panels for sensing touch. The design of touch electrodes in the touch panels influences the performance of the mutual capacitive touch screen.

Undesired electrode images can appear in conventional touch panels. Although some conventional touch panels use electrodes with relatively small sizes in order to reduce electrode images, moire fringes appear when the conventional touch panels are applied to mutual capacitive touch screens. Thus, conventional touch panels cannot suppress an appearance of moire fringes while ensuring eliminations of undesired electrode images.

SUMMARY

In one aspect, the present disclosure provides a touch panel. The touch panel includes a substrate, a first touch electrode disposed over the substrate and including a first sub-electrode and a second sub-electrode electrically coupled to each other, and a second touch electrode disposed over the substrate and intersecting the first touch electrode. The first sub-electrode and the second sub-electrode are arranged in an extension direction of the first touch electrode. The first sub-electrode includes a first strip-shaped electrode. The second sub-electrode includes a second strip-shaped electrode. An angle between an extension direction of the first strip-shaped electrode and an extension direction of the second strip-shaped electrode is non-zer.

BRIEF DESCRIPTION OF THE FIGURES

The following drawings are merely examples for illustrative purposes according to various disclosed embodiments and are not intended to limit the scope of the present disclosure.

DETAILED DESCRIPTION

Exemplary embodiments of the disclosure will now be described in more detail with reference to the drawings. It is to be noted that, the following descriptions of some embodiments are presented herein for purposes of illustration and description only, and are not intended to be exhaustive or to limit the scope of the present disclosure.

The aspects and features of the present disclosure can be understood by those skilled in the art through the exemplary embodiments of the present disclosure further described in detail with reference to the accompanying drawings.

Figure 1:
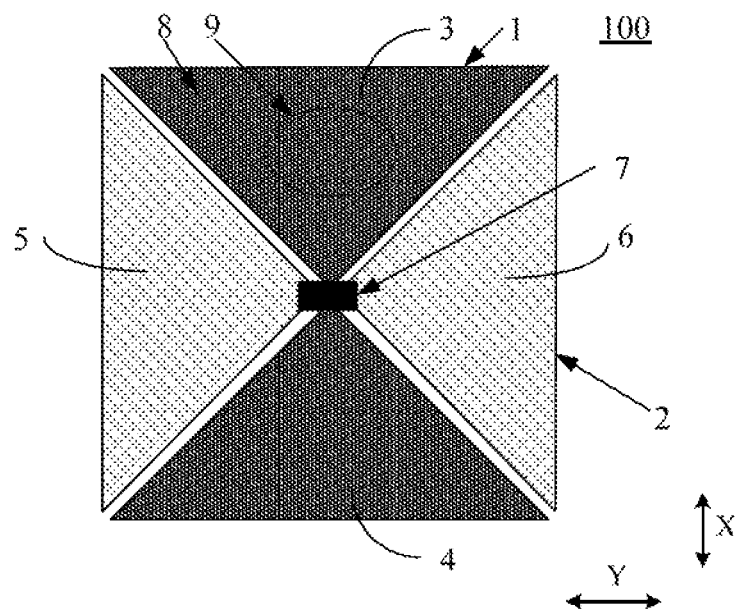
FIG. 1 illustrates a schematic view of a conventional touch panel.

FIG. 1 illustrates a schematic view of a conventional touch panel 100. As shown in FIG. 1, the conventional touch panel 100 includes a first touch electrode 1 and a second touch electrode 2 arranged to intersect each other and arranged in a same layer. The first touch electrode 1 includes a first sub-electrode 3 and a second sub-electrode 4 arranged in a first direction X. The first sub-electrode 3 and the second sub-electrode 4 are located on two sides of the second touch electrode 2, respectively. The first sub-electrode 3 and the second sub-electrode 4 are electrically coupled by direct coupling. The second touch electrode 2 includes a third sub-electrode 5 and a fourth sub-electrode 6, arranged in a second direction Y. The third sub-electrode 5 and the fourth sub-electrode 6 are located on two sides of the first touch electrode 1, respectively. Further, the third sub-electrode 5 and the fourth sub-electrode 6 are electrically coupled through a metal bridge wire 7. The four sub-electrodes 3, 4, 5, and 6 are triangular electrodes with a relatively large size.

In the touch panel 100 shown in FIG. 1, an edge region 8 of a triangular electrode has a relatively high brightness, because a gap existing near the edge region 8 has a relatively high light transmittance. A middle region 9 of the triangular electrode has a relatively low brightness. As a result, an image of the triangular electrode can be observed by a user. Thus, the performance of the touch panel shown in FIG. 1 to remove undesired electrode images is relatively poor.

Figure 2:
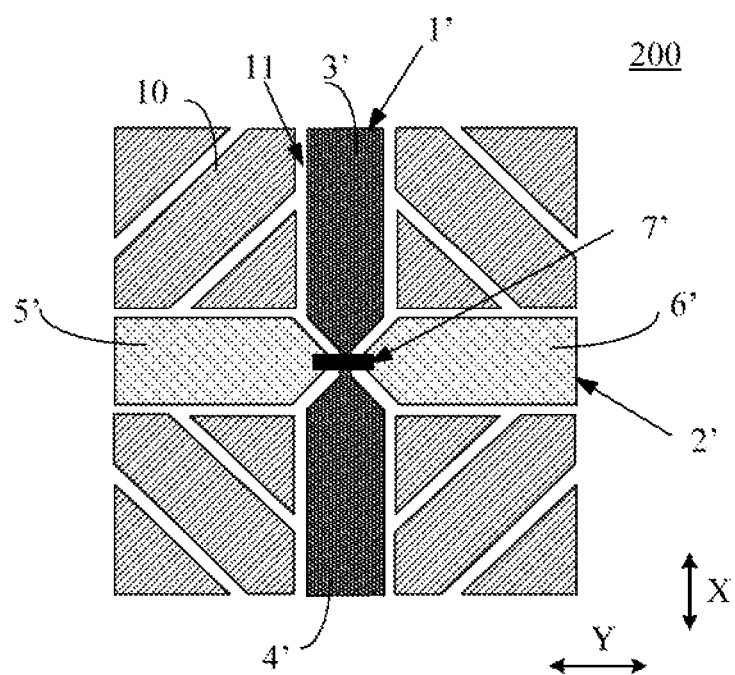
FIG. 2 illustrates a schematic view of another conventional touch panel.

Another conventional touch panel will be described with reference to FIG. 2. FIG. 2 illustrates a schematic view of another conventional touch panel 200. The touch panel 200 includes a first electrode 1' and a second electrode 2'. The first electrode 1" includes a first sub-electrode 3' and a second sub-electrode 4'. The second electrode 2' includes a third sub-electrode 5' and a fourth sub-electrode 6'. Different from the four sub-electrodes shown in FIG. 1 which are triangular electrodes having a relatively large size, in the touch panel 200 shown in FIG. 2, the four sub-electrodes 3', 4', 5', and 6' are strip-shaped electrodes. As shown in FIG. 2, the first sub-electrode 3' and the second sub-electrode 4' both extend in a first direction X and are on a same straight line. The third sub-electrode 5' and the fourth sub-electrode 6' both extend in a second direction Y and are on a same straight line. The third sub-electrode 5' and the fourth sub-electrode 6' are electrically coupled through a metal bridge wire 7'. In addition, for uniform light transmittance in different regions of the touch panel, dummy patterns 10 are provided over substrate regions where the touch electrodes (i.e., the four sub-electrodes) do not cover. The dummy patterns 10 have a same light transmittance as the touch electrodes 1', 2', and have relatively small sizes. The dummy patterns 10 are electrically insulated from the touch electrodes 1', 2'.

In the touch panel 200 shown in FIG. 2, because sizes of the strip-shaped electrodes and the dummy patterns 10 are relatively small, the high brightness at edges of the electrodes can cause the brightness of the middle regions of the electrodes to increase. As a result, the brightness in most regions of the strip-shaped electrodes and the dummy patterns 10 are relatively high, and a user may not observe electrode images, and thus a performance of eliminating undesired electrode images is improved.

Figure 3:
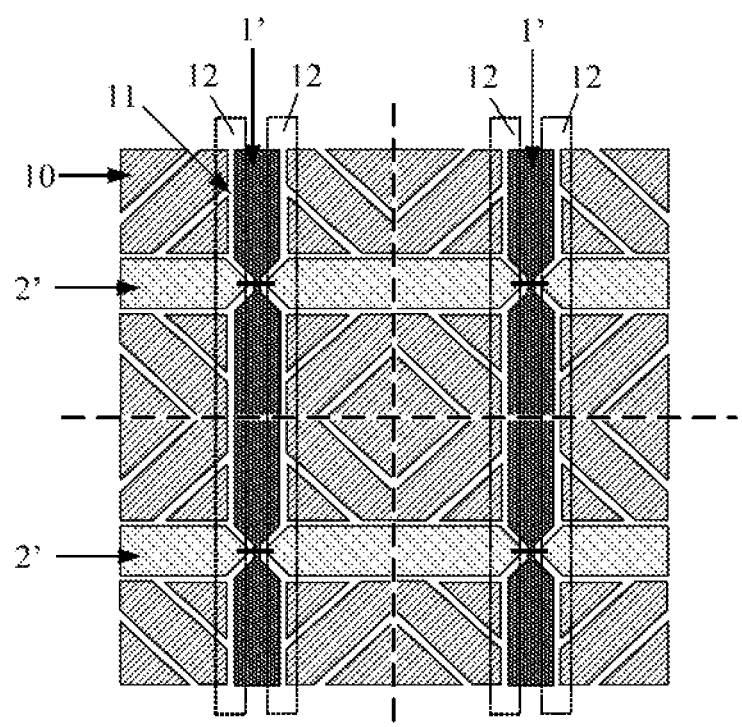
FIG. 3 illustrates a schematic view of a mutual capacitive touch screen formed by touch panels as shown in FIG. 2.

However, when the touch panels 200 shown in FIG. 2 are applied to a mutual capacitive touch screen, long-strip-shaped moire fringes are generated on the mutual capacitive touch screen. FIG. 3 illustrates a schematic view of a mutual capacitive touch screen formed by touch panels in FIG. 2. As shown in FIG. 3, when parallel light emitted from a backlight source passes through the touch panels, because regions covered by electrodes such as the touch electrodes 1', 2' and the dummy patterns 10 have a different transmittance as compared to regions without electrodes such as gaps 11, multi-slit interference of transmitted light occurs at the gaps 11, causing moire fringes to appear at the gaps 11. Because the gaps between the dummy patterns 10 are irregularly arranged, no long-strip-shaped type moire fringes appear. As a result, corresponding moire fringes are not clear. However, the gaps between the dummy patterns 10 and the touch electrodes 1', 2' are regularly arranged. For example, for the first touch electrodes 1', the moire fringes at the edges of the first touch electrodes 1' in a same column are coupled to each other, and arranged on a same straight line. Thus, a relatively lung vertical long-strip-shaped moire fringe region 12 appears. As a result, moire fringes are clear.

Thus, conventional touch panels cannot suppress an appearance of moire fringes while ensuring eliminations of undesired electrode images.

Figure 4A:
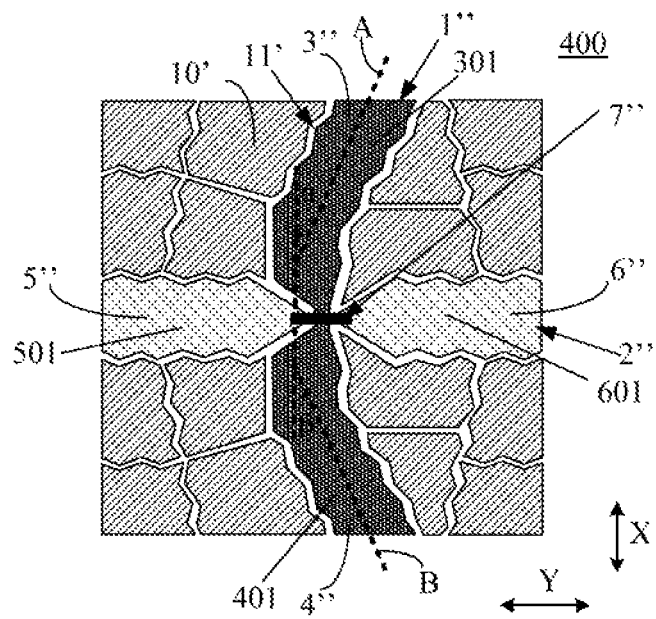
FIG. 4A illustrates a schematic view of an exemplary touch panel according to various disclosed embodiments of the present disclosure.

FIG. 4A illustrates a schematic view of an exemplary touch panel 400 according to various disclosed embodiments of the present disclosure. As shown in FIG. 4A, the touch panel 400 includes a substrate, and a first touch electrode 1" and a second touch electrode 2" arranged to intersect each other and arranged over the substrate. The first touch electrode 1" includes a first sub-electrode 3" and a second sub-electrode 4". The first sub-electrode 3" and the second sub-electrode 4" are arranged in a first direction X. The first sub-electrode 3" and the second sub-electrode 4" are located on two sides of the second touch electrode 2", respectively, and are electrically coupled to each other. The first sub-electrode 3" at least includes one first strip-shaped electrode 301. The second sub-electrode 4" at least includes one second strip-shaped electrode 401 which is configured corresponding to the first strip-shaped electrode 301. An extension direction A of the first strip-shaped electrode 301 is not on a same straight line as an extension direction B of the second strip-shaped electrode 401.

In some embodiments, the first touch electrode 1" and the second touch electrode 2" can be arranged in a same layer. In some other embodiments, the first touch electrode 1" and the second touch electrode 2" can be arranged in different layers. In some embodiments of the present disclosure, descriptions are made with respect to the scenarios that the first touch electrode 1" and the second touch electrode 2" are arranged in a same layer as examples.

In some embodiments, because the extension direction A of the first striped-shaped electrode 301 is not on a same straight line as the extension direction B of the second strip-shaped electrode 401, after dummy patterns 10' are disposed, a first portion of a gap 11' between the first strip-shaped electrode 301 and the dummy patterns 10' is not on a same straight line as a second portion of the gap 11' between the second strip-shaped electrode 401 and the dummy patterns 10'. A polyline type geometrical relationship is formed between the first portion of the gap 11' and the second portion of the gap 11'. The dummy patterns 10' are electrically insulated from both the first touch electrode 1" and the second touch electrode 2".

In some embodiments, a dummy pattern, e.g., the dummy pattern 10', may include a same material as a touch electrode, e.g., the first touch electrode 1".

In some embodiments, a material of the touch electrodes 1", 2" and the dummy patterns 10' may include indium tin oxide (ITO).

In the present disclosure, a strip-shaped electrode may include at least one of a straight-line-type strip-shaped electrode, e.g., the first strip-shaped electrode 301 shown in FIG. 4A, a curved-line-type strip-shaped electrode, or another type of strip-shaped electrode. That is, strip-shape may include at least one of a straight-line-type strip-shape, a curved-line-type strip-shape, or another type of strip-shape. In the present disclosure, the type of strip-shaped electrode may include at least one of a straight-line-type, a curved-line-type, or another suitable type, which is not restricted and may be selected according to various application scenarios.

Figure 4B:
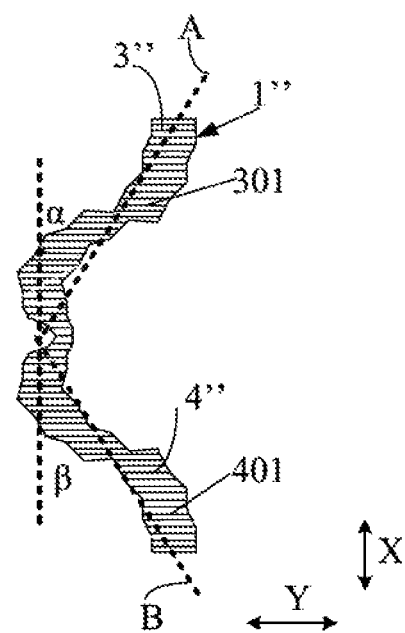
FIG. 4B illustrates a schematic view of an exemplary first touch electrode according to various disclosed embodiments of the present disclosure.

For example, the first strip-shaped electrode 301 may include a curved-line-type strip-shaped electrode as described below. FIG. 4B illustrates a schematic view of an exemplary first touch electrode according to various disclosed embodiments of the present disclosure. As shown in FIG. 4B, the first touch electrode 1" includes a first sub-electrode 3" and a second sub-electrode 4". The first sub-electrode 3" and the second sub-electrode 4" are arranged in a first direction X. The first sub-electrode 3" at least includes one first strip-shaped electrode 301. The second sub-electrode 4" at least includes one second strip-shaped electrode 401 which is configured corresponding to the first strip-shaped electrode 301. An extension direction A of the first strip-shaped electrode 301 is not on a same straight line as an extension direction B of the second strip-shaped electrode 401. Different from FIG. 4A, in FIG. 4B, the first strip-shaped electrode 301 includes a curved-line-type strip-shaped electrode, instead of a straight-line-type strip-shaped electrode, and the second strip-shaped electrode 401 includes a curved-line-type strip-shaped electrode, instead of a straight-line-type strip-shaped electrode. A strip of a curved-line-type strip-shaped electrode follows a curved-line. An extension direction A of the first strip-shaped electrode 301 that includes a curved-line-type strip-shaped electrode may refer to, for example, an overall direction for the curved-line-type strip-shaped electrode. The overall direction for the curved-line-type strip-shaped electrode, may be defined as, for example, a direction following a straight line that is a least-square-fitting line for the curved-line of the curved-line-type strip-shaped electrode. Similarly, an extension direction B of the second strip-shaped electrode 401 that includes a curved-line-type strip-shaped electrode may refer to, for example, an overall direction for the curved-line-type strip-shaped electrode, and may be defined in a similar manner described above.

Figure 5:
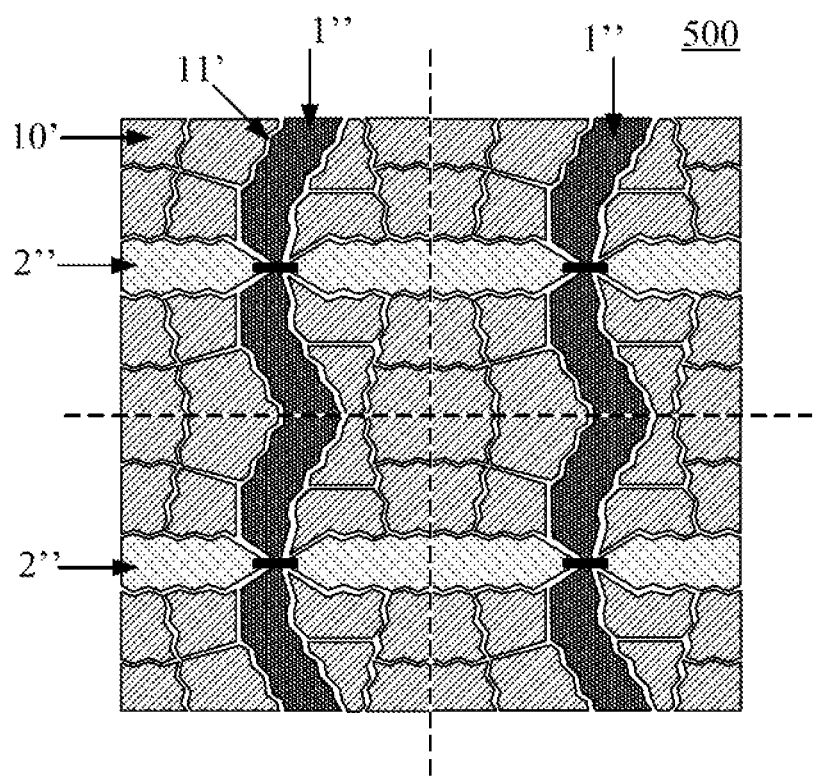
FIG. 5 illustrates a schematic view of an exemplary mutual capacitive touch screen formed by the exemplary touch panels as shown in FIG. 4A according to various disclosed embodiments of the present disclosure.

FIG. 5 illustrates a schematic view of an exemplary mutual capacitive touch screen 500 formed by the exemplary touch panels 400 as shown in FIG. 4A according to various disclosed embodiments of the present disclosure. As shown in FIG. 5, the gap 11' between the first touch electrodes 1" and the dummy patterns 10' in the mutual capacitive touch panel 500 has a polyline shape.

Figure 6:
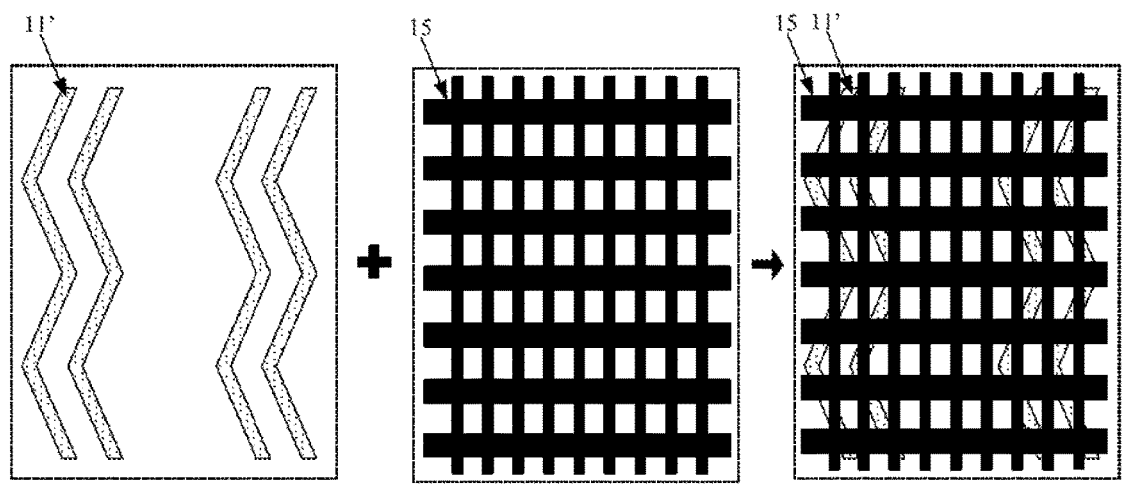
FIG. 6 illustrates a simulated diagram of the polyline-shaped gaps stacked with a light-shielding matrix in a touch display device.

A light-shielding matrix may be provided in a touch display device. The light-shielding matrix may include a plurality of lateral light-shielding strips in parallel and a plurality of vertical light-shielding strips in parallel. Further, the lateral light-shielding strips may generally have greater widths than the vertical light-shielding strips. FIG. 6 illustrates a simulated diagram of the polyline-shaped gaps stacked with a light-shielding matrix 15 in a touch display device. As shown in FIG. 6, the light-shielding matrix 15 "divides" the polyline-shaped gaps into a plurality of relatively small portions, i.e., portions of the polyline-shaped gaps 11' not covered by the light-shielding matrix 15, that are arranged irregularly. Although the portions of the gaps 11' not covered by the light-shielding matrix 15 may still have moire fringes, the moire fringes are not clear and long-strip-shaped moire fringes do not exist because the portions are relatively small and irregularly arranged. Thus, the electrode structure of the touch panel 400 may suppress an appearance of strip-shaped moire fringes extending in the first direction X.

In some embodiments, an angle α between the extension direction A of the first strip-shaped electrode 301 and the first direction X may range from approximately 20° to approximately 25°. An angle β between the extension direction B of the second strip-shaped electrode 401 and the first direction X may range from approximately 20° to approximately 25°. In this case, a performance of weakening moire fringes may be better. Further, in some other embodiments, the angle α between the extension direction A of the first strip-shaped electrode 301 and the first direction X may be approximately 22.5°. The angle β between the extension direction B of the second strip-shaped electrode 401 and the first direction X may be approximately 22.5°.

In some embodiments of the present disclosure, the angle α between the extension direction A of the first strip-shaped electrode 301 and the first direction X may be selected in a range from approximately 20° to approximately 25°, and the angle β between the extension direction B of the second strip-shaped electrode 401 and the first direction X may be selected in a range from approximately 20° to approximately 25°, according to various application scenarios, in the present disclosure, moire fringes can be suppressed by arranging the extension direction A of the first strip-shaped electrode 301 on a straight line different from the extension direction B of the second strip-shaped electrode 401.

In some embodiments, the second touch electrode 2" includes a third sub-electrode 5" and a fourth sub-electrode 6". The third sub-electrode 5" and the fourth sub-electrode 6" are arranged in the second direction Y. The third sub-electrode 5" and the fourth sub-electrode 6" are located on two sides of the first touch electrode 1", respectively, and are electrically coupled to each other. The third sub-electrode 5" includes a third strip-shaped electrode 501, and the fourth sub-electrode 6" includes a fourth strip-shaped electrode 601.

In some embodiments, the touch electrodes 1", 2" and the dummy patterns 10' over the substrate are relatively small electrodes, such as relatively small strip-shaped electrodes. Thus, the touch electrodes 1", 2" and the dummy patterns 10' have a relatively good performance of eliminating electrode images.

Figure 7:
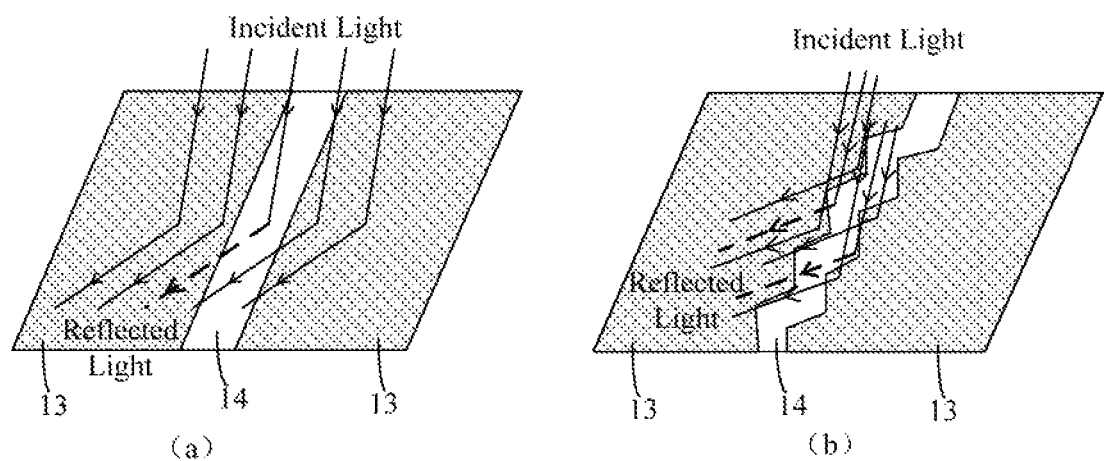
FIG. 7 illustrates a comparison between an optical path of light reflected at linear edges and an optical path of light reflected at polyline-shaped edges.

In some embodiments, edges of the dummy patterns 10' may have polyline shapes. Edges of the first touch electrode 1" and the second touch electrode 2" may also have polyline shapes. FIG. 7 illustrates a comparison between an optical path alight reflected at linear edges and an optical path of light reflected at polyline-shaped edges. As shown in FIG. 7, the substrate has different reflectance as compared to the electrodes such as the touch electrodes 1", 2", and the dummy patterns 10'. Thus, reflected light after passing through a region 13 over the substrate covered by electrodes has a different intensity as compared to reflected light after passing through a region 14 over the substrate not covered by electrodes. In a linear edge scheme, because the reflected light does not interfere, a user can see clear boundaries between bright and dark regions at the edges of the electrodes, in a polyline-shaped edge scheme, because the reflected light interferes, the luminance superposition effect is generated in most regions at the edges of the electrodes. Thus, the user may not see clear boundaries between bright and dark regions at the edges of the electrodes. Thus, according to the present disclosure, the performance of eliminating electrode images can be further improved by configuring the edges of the touch electrodes 1", 2" and the dummy patterns 10' polyline shapes.

In some embodiments, angles at turning points of polyline-shaped edges of the dummy patterns 10 may range from approximately 30° to approximately 150°. Angles at turning points of polyline-shaped edges of the first touch electrodes may range from approximately 30° to approximately 150°. Angles at turning points of polyline-shaped edges of the second touch electrodes may range from approximately 30° to approximately 150°.

In some embodiments, as shown in FIG. 4A, the third strip-shaped electrode 501 and the fourth strip-shaped electrode 601 appear to be located on a same straight line, which is merely for illustrative purposes and does not limit the scope of the present disclosures. In some other embodiments, the third strip-shaped electrode 501 can be located on a straight line different from the fourth strip-shaped electrode 601. Whether or not the third strip-shaped electrode 501 and the fourth strip-shaped electrode 601 are located on a same straight line is not restricted in the present disclosure, and can be selected according to various application scenarios.

In addition, the direct coupling between the first sub-electrode 3" and the second sub-electrode 4" shown in FIG. 4A is merely for illustrative purposes and does not limit the scope of the present disclosure. The coupling between the third sub-electrode 5" and the fourth sub-electrode 6" through a metal bridge wire 7" shown in FIG. 4A is merely for illustrative purposes and does not limit the scope of the present disclosure.

The present disclosure provides a touch panel. The touch panel not only can have a relatively good performance of eliminating electrode images, but also can suppress appearance of moire fringes.

Figure 8:
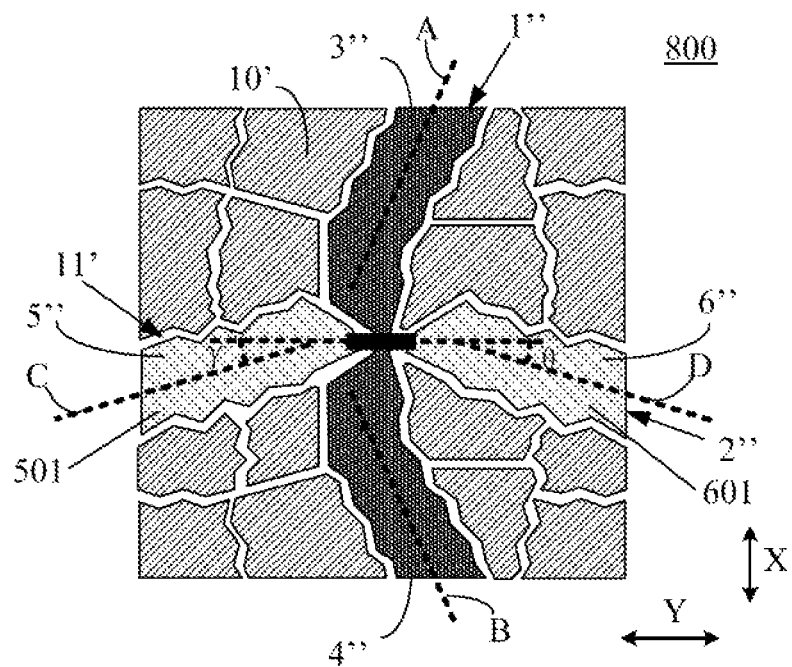
FIG. 8 illustrates a schematic view of another exemplary touch panel according to various disclosed embodiments of the present disclosure.

FIG. 8 illustrates a schematic view of another exemplary touch panel 800 according to various disclosed embodiments of the present disclosure. In some embodiments, as shown in FIG. 8, the first touch electrode 1" in the touch panel 800 has a same structure as the first touch electrode 1" in the touch panel 400. Reference can be made to the descriptions about the first touch electrode 1" in the touch panel 400, which will not be described here again. Different from the touch panel 400, in the touch panel 800 shown in FIG. 8, an extension direction C of the third strip-shaped electrode 501 is not on a same straight line as an extension direction D of the fourth strip-shaped electrode 601. Accordingly, a third portion of the gap 11' between the third strip-shaped electrode 501 and the dummy patterns 10' is not located on a same straight line as a fourth portion of the gap 11' between the fourth strip-shaped electrode 601 and the dummy patterns 10'. A polyline type geometrical relationship is formed between the third portion of the gap 11' and the fourth portion of the gap 11'. That is, the portions of the gap 11' between the second touch electrode 2" and the dummy patterns 10' in the touch panel 800 have a polyline shape. Accordingly, the portions of the gap 11' between the second touch electrodes 2" and the dummy patterns 10' in a corresponding mutual capacitive touch screen have polyline shapes.

Similarly, a light-shielding matrix may "divide" the polyline-shaped gap 11' into a plurality of relatively small and irregularly arranged portions, such that an appearance of strip-shaped moire fringes extending in the second direction Y can be suppressed.

In some embodiments, an angle γ between an extension direction C of the third strip-shaped electrode 501 and the second direction Y may range from approximately 20° to approximately 25°. An angle of θ between an extension direction D of the fourth strip-shaped electrode 601 and the second direction Y may range from approximately 20° to approximately 25°. Accordingly, performance of weakening moire fringes may be relatively good. Further, in some other embodiments, the angle γ between the extension direction C of the third strip-shaped electrode 501 and the second direction Y may be approximately 22.5°. The angle θ between the extension direction D of the fourth strip-shaped electrode 601 and the second direction Y may be approximately 22.5°.

Technical solutions of the present disclosure not only may suppress an appearance of strip-shaped moire fringes extending in the first direction X, but also may suppress an appearance of strip-shaped moire fringes extending in the second direction Y.

Figure 9:
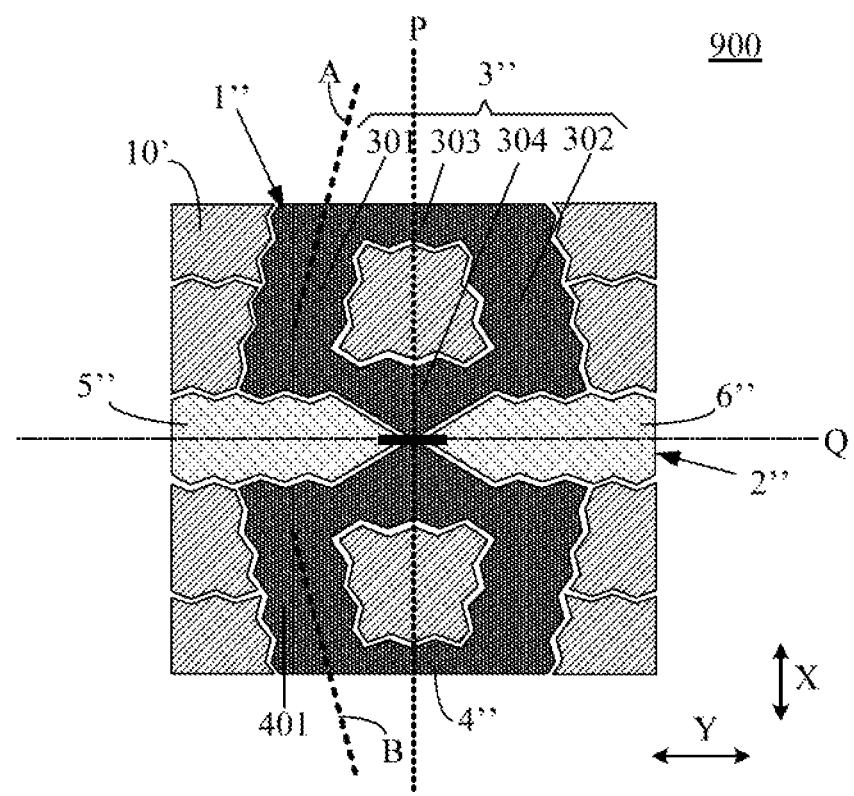
FIG. 9 illustrates a schematic view of another exemplary touch panel according to various disclosed embodiments of the present disclosure.

FIG. 9 illustrates a schematic view of another exemplary touch panel 900 according to various disclosed embodiments of the present disclosure. As shown in. FIG. 9, the second touch electrode 2" in the touch panel 900 has a same structure as the second touch electrode 2" in the touch panel 400. Reference can be made to the descriptions about the second touch electrode 2" in the touch panel 400, which will not be described here again. Different from the touch panel 400, in the touch panel 900, the first sub-electrode 3" further includes a fifth strip-shaped electrode 302, a sixth strip-shaped electrode 304, and a seventh strip-shaped electrode 303, besides the first strip-shaped electrode 301. The fifth strip-shaped electrode 302 and the first strip-shaped electrode 301 are symmetrical with respect to a first symmetry axis P. The fifth strip-shaped electrode 302 and the first strip-shaped electrode 301 each has one end that is closer to the second touch electrode 2", and another end that is further away from the second touch electrode 2". A first end of the sixth strip-shaped electrode 304 is coupled to one end of the first strip-shaped electrode 301 that is closer to the second touch electrode 2". A second end of the sixth strip-shaped electrode 304 is coupled to one end of the fifth strip-shaped electrode 302 that is closer to the second touch electrode 2". A first end of the seventh strip-shaped electrode 303 is coupled to the end of the first strip-shaped electrode 301 that is further away from the second touch electrode 2". A second end of the seventh strip-shaped electrode 303 is coupled to the end of the fifth strip-shaped electrode 302 that is further away from the second touch electrode 2".

In some embodiments, the second sub-electrode 4" and the first sub-electrode 3" have a same shape, and are symmetrically arranged with respect to a second symmetry axis Q.

The first symmetry axis P includes a straight line passing through an intersection of the first touch electrode 1" and the second touch electrode 2", and has an extension direction in the first direction X. The second symmetry axis Q includes a straight line passing through the intersection of the first touch electrode 1" and the second touch electrode 2", and has an extension direction in the second direction Y.

In comparison to the touch panel 400, in the touch panel 900, a direct-facing edge between the first touch electrode 1" and the second touch electrode 2", e.g., an edge of the sixth strip-shaped electrode 304 on one side that directly faces the second touch electrode 2", is longer. A longer direct-facing edge between the first touch electrode 1" and the second touch electrode 2" can effectively increase a mutual capacitance between the first touch electrode 1" and the second touch electrode 2", thereby effectively improving a touch recognition accuracy of touch panel.

In addition, the entire touch panel is symmetrical with respect to the first symmetry axis and the second symmetry axis. Such a symmetrical structure can facilitate a better distribution of corresponding electromagnetic field, making distributions of mutual capacitance and self-capacitance more reasonable and integrated circuit (IC) tests easier.

In some embodiments, the second touch electrode 2" can have a structure similar to the second touch electrode 2" of the touch panel 800 shown in FIG. 8, rather than that shown in FIG. 9. The structure of the second touch electrode 2" in the touch panel 800 has been described in detail, descriptions of which will not be repeated here. The drawing for such a configuration is not shown here.

The first touch electrode 1" of the present disclosure is not limited to that shown in the drawings. The first touch electrode 1" can be any touch electrode including the first strip-shaped electrode 301 and the second strip-shaped electrode 401 extending in different directions, such as the extension direction A and the extension direction B.

In the present disclosure, a strip-shaped electrode may include at least one of a straight-line-type strip-shaped electrode, a curved-line-type strip-shaped electrode, or another type of strip-shaped electrode. That is, strip-shape may include at least one of a straight-line-type strip-shape, a curved-line-type strip-shape, or another type of strip-shape. For example, in some embodiments, the first strip-shaped electrode 301, the fifth strip-shaped electrode 302, the sixth strip-shaped electrode 304, and the seventh strip-shaped electrode 303 may each include an arc-type strip-shaped electrode (not shown in FIG. 9), such that the first sub-electrode 3" may include a circular shape having a central open area (not shown in FIG. 9). In the present disclosure, the type of strip-shaped electrode may include at least one of a straight-line-type, a curved-line-type, or another suitable type, which is not restricted and may be selected according to various application scenarios.

Figure 10:
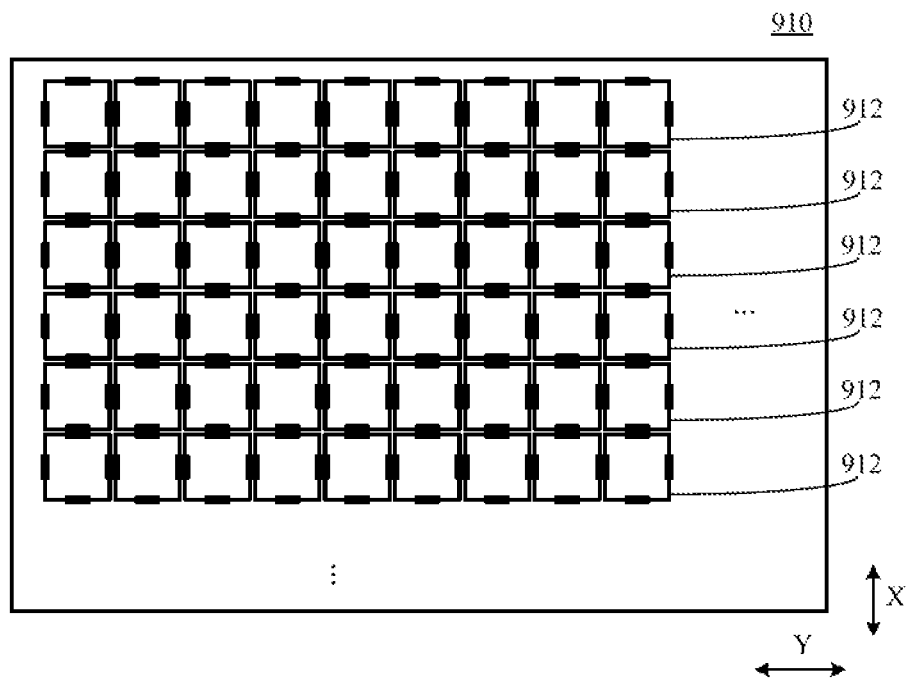
FIG. 10 illustrates a schematic view of an exemplary mutual capacitive touch screen according to various disclosed embodiments of the present disclosure.

The present disclosure provides a mutual capacitive touch screen. FIG. 10 illustrates a schematic view of an exemplary mutual capacitive touch screen 910 according to various disclosed embodiments of the present disclosure. As shown in FIG. 10, the mutual capacitive touch screen 910 includes a plurality of touch panels 912. The touch panel 912 can be any touch panel consistent with the disclosure, such as any one of the exemplary touch panels 400, 800, and 900 described above. Reference can be made to the corresponding descriptions, which will not be described here again. Any mutual capacitive touch screen including a touch panel consistent with the disclosure is within the scope of the present disclosure.

In some embodiments of the present disclosure, as shown in FIG. 10, using the first direction X as a column direction and the second direction Y as a row direction as examples, touch panels 912 in the mutual capacitive touch screen form a touch array. Further, first touch electrodes 1" in pixel units located in a same column are coupled end-to-end and one-by-one to form a signal transmission path extending in the column direction. The second touch electrodes 2" in pixel units located in a same row are coupled end-to-end and one-by-one to form a signal transmission path extending in the row direction. Principles of realizing touch recognition through signal transmissions in the mutual capacitive touch screen will not be further described here.

In various application scenarios, a size of the touch panel can be selected according to a size of the mutual capacitive touch screen and a touch recognition resolution. In some embodiments of the present disclosure, the touch panel can have a rectangular shape, and a length of each side of the rectangular shape can range from approximately 3 mm to approximately 10 mm.

Figure 11:
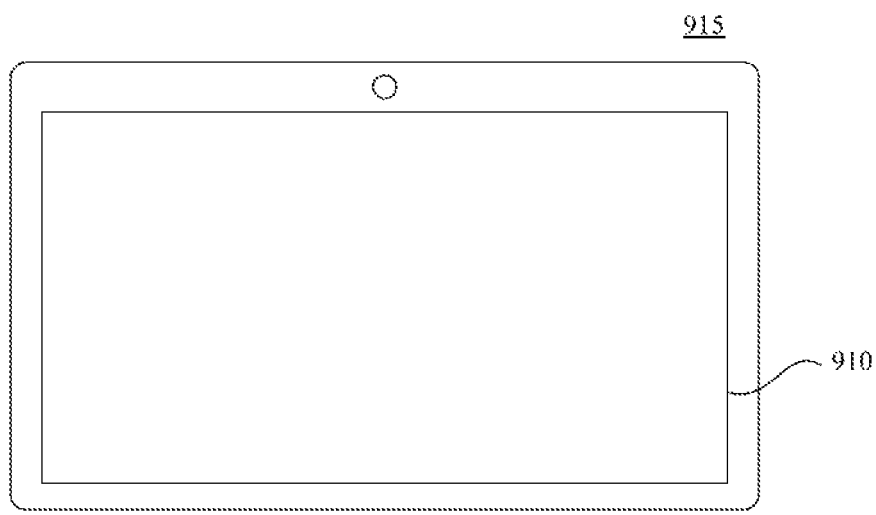
FIG. 11 illustrates a schematic view of an exemplary touch display device according to various disclosed embodiments of the present disclosure.

The present disclosure provides a touch display device. FIG. 11 illustrates a schematic view of an exemplary touch display device 915 according to various disclosed embodiments of the present disclosure. As shown in FIG. 11, the touch display device 915 includes a mutual capacitive touch screen consistent with the disclosure, such as the mutual capacitive touch screen 910. The mutual capacitive touch screen can be any mutual capacitive touch screen consistent with the disclosure. Reference can be made to the corresponding descriptions for the mutual capacitive touch screen, which will not be described here again.

The touch display device 915 can be, for example, a liquid crystal panel, an electronic paper, an organic light-emitting diode (OLED) panel, an active-matrix organic light-emitting diode (AMOLED) panel, a mobile phone, a tablet computer, a television, a monitor, a notebook computer, a digital photo frame, a navigating instrument, or any other suitable product or component having a touch display function. Any touch display device including a mutual capacitive touch screen consistent with the disclosure is within the scope of the present disclosure.

In some embodiments, the mutual capacitive touch screen can include an embedded mutual capacitive touch screen or a plug-in mutual capacitive touch screen. In some embodiments, the embedded mutual capacitive touch screen may include an on-cell type mutual capacitive touch screen. In some embodiments, the plug-in mutual capacitive touch screen may include a one-glass-solution (OGS) type mutual capacitive touch screen.

Figure 12:
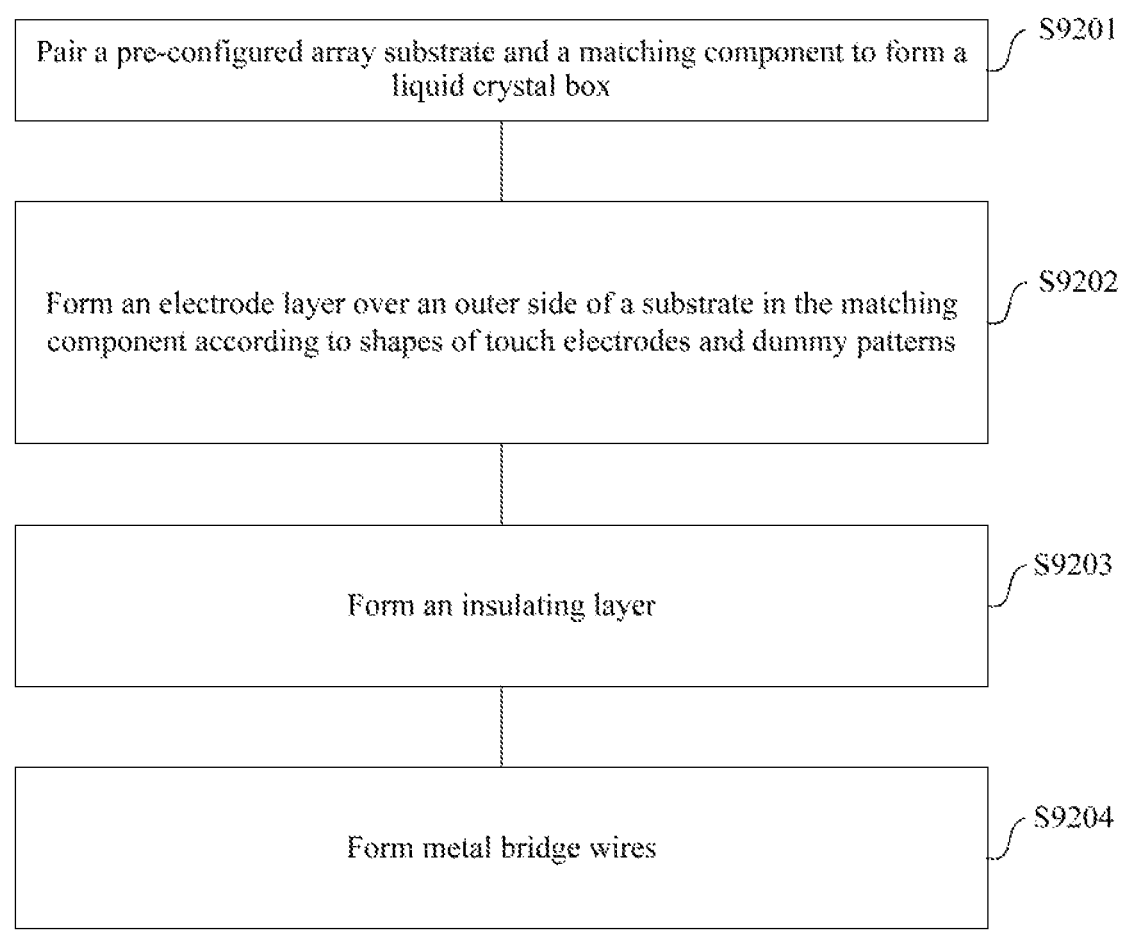
FIG. 12 illustrates a flow chart of an exemplary process of fabricating an exemplary on-cell type mutual capacitive touch screen according to various disclosed embodiments of the present disclosure.

Descriptions will now be made for a process of fabricating the on-cell type mutual capacitive touch screen with reference to FIG. 12. FIG. 12 illustrates a flow chart of an exemplary process of fabricating an exemplary on-cell type mutual capacitive touch screen according to various disclosed embodiments of the present disclosure.

At S9201, a pre-configured array substrate and a matching component are paired to form a liquid crystal box.

At S9202, an electrode layer is formed over an outer side of a substrate in the matching component according to shapes of touch electrodes and dummy patterns, where the electrode layer can include ITO as an example. In some embodiments, forming the electrode layer includes ITO coating, photoresist coating, exposure, development, and etching, to form a desired pattern of the touch electrodes and dummy patterns.

At S9203, an insulating layer is formed. In some embodiments, forming the insulating layer includes coating an insulating material which may be a photoresist, exposure, and development, to form a desired pattern of the insulating layer.

At S9204, metal bridge wires are formed. In some embodiments, forming the metal bridge wires includes metal coating, photoresist coating, exposure, development, and etching, to form a desired pattern of the metal bridge wires.

Figure 13:
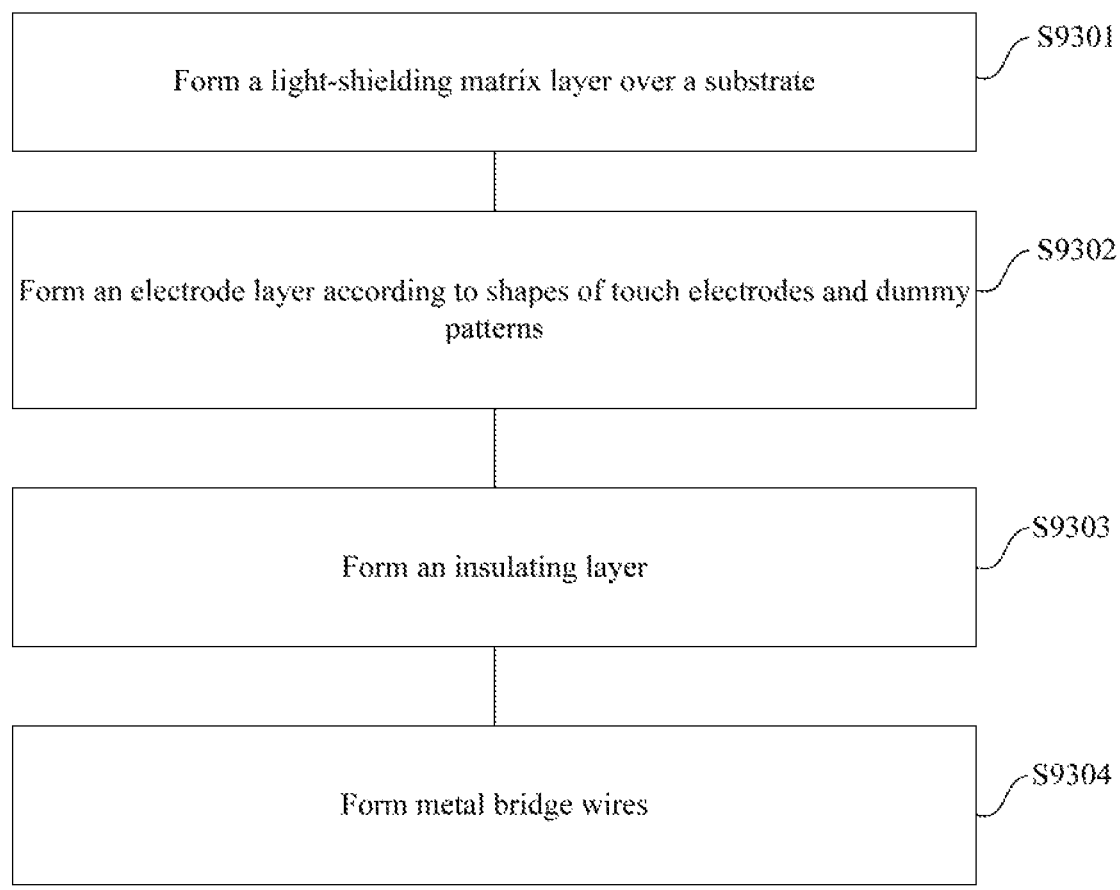
FIG. 13 illustrates a flow chart of an exemplary process of fabricating an exemplary one-glass-solution type mutual capacitive touch screen according to various disclosed embodiments of the present disclosure.

Descriptions will be now made with reference to FIG. 13 for a process of fabricating the OGS type mutual capacitive touch screen. FIG. 13 illustrates a flow chart of an exemplary process of fabricating an exemplary one-glass-solution type mutual capacitive touch screen according to various disclosed embodiments of the present disclosure.

At S9301, a light-shielding matrix layer is formed over a substrate. In some embodiments, forming the light-shielding matrix layer includes coating a light-shielding material, exposure, and development, to form a desired pattern of the light-shielding matrix layer.

At S9302, an electrode layer is formed according to shapes of touch electrodes and dummy patterns. In some embodiments, forming the electrode layer includes ITO coating, photoresist coating, exposure, development, and etching, to form a desired pattern of the touch electrodes and dummy patterns.

At S9303, an insulating layer is formed. In some embodiments, forming the insulating layer includes coating an insulating material, exposure, and development, to form a desired pattern of the insulating layer.

At S9304, metal bridge wires are formed. In some embodiments, forming the metal bridge wires includes metal coating, photoresist coating, exposure, development and etching, to form a desired pattern of the metal bridge wires.

The present disclosure provides a touch panel, a mutual capacitive touch screen, and a touch display device. The touch panel includes a substrate, and a first touch electrode and a second touch electrode arranged to intersect each other and arranged over the substrate. The first touch electrode may include a first sub-electrode and a second sub-electrode. The first sub-electrode and the second sub-electrode may be arranged in a first direction, and may be electrically coupled. The first sub-electrode may at least include one first strip-shaped electrode. The second sub-electrode may at least include one second strip-shaped electrode. An extension direction of the first strip-shaped electrode may not be on a same straight line as an extension direction of the second strip-shaped electrode. The touch panel of the present disclosure not only can have a relatively good performance of eliminating electrode images, but also can suppress the appearance of moire fringes.

The foregoing description of the embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to persons skilled in this art. The embodiments are chosen and described in order to explain the principles of the technology, with various modifications suitable to the particular use or implementation contemplated. It is intended that the scope of the invention be defined by the claims appended hereto and their equivalents in which all terms are meant in their broadest reasonable sense unless otherwise indicated. Therefore, the term "the disclosure," "the present disclosure," or the like does not necessarily limit the claim scope to a specific embodiment, and the reference to exemplary embodiments of the disclosure does not imply a limitation on the invention, and no such limitation is to be inferred. Moreover, the claims may refer to "first," "second," etc, followed by a noun or element. Such terms should be understood as a nomenclature and should not be construed as giving the limitation on the number of the elements modified by such nomenclature unless specific number has been given. Any advantages and benefits described may or may not apply to all embodiments of the disclosure. It should be appreciated that variations may be made to the embodiments described by persons skilled in the art without departing from the scope of the present disclosure. Moreover, no element or component in the present disclosure is intended to be dedicated to the public regardless of whether the element or component is explicitly recited in the following claims.

What is claimed is:

1. A touch panel, comprising:
a substrate;
a first touch electrode disposed over the substrate and including a first sub-electrode and a second sub-electrode electrically coupled to each other, wherein:
the first sub-electrode and the second sub-electrode are arranged in an extension direction of the first touch electrode,
the first sub-electrode includes a first strip-shaped electrode,
the second sub-electrode includes a second strip-shaped electrode, and
an angle between an extension direction of the first strip-shaped electrode and an extension direction of the second strip-shaped electrode is non-zero; and
a second touch electrode disposed over the substrate and intersecting the first touch electrode, wherein:
the first sub-electrode further includes a third strip-shaped electrode,
the third strip-shaped electrode and the first strip-shaped electrode are symmetrically arranged with respect to a symmetry axis passing through an intersection of the first touch electrode and the second touch electrode and extending along the extension direction of the first touch electrode,
the first sub-electrode further includes a fourth strip-shaped electrode and a fifth strip-shaped electrode,
a first end of the fourth strip-shaped electrode is coupled to a first end of the first strip-shaped electrode that is closer to the second touch electrode,
a second end of the fourth strip-shaped electrode is coupled to a first end of the third strip-shaped electrode that is closer to the second touch electrode,
a first end of the fifth strip-shaped electrode is coupled to a second end of the first strip-shaped electrode that is further away from the second touch electrode, and
a second end of the fifth strip-shaped electrode is coupled to a second end of the third strip-shaped electrode that is further away from the second touch electrode.

2. The touch panel according to claim 1, wherein:
an angle between the extension direction of the first strip-shaped electrode and the extension direction of the first touch electrode ranges from approximately 20° to approximately 25°, and
an angle between the extension direction of the second strip-shaped electrode and the extension direction of the first touch electrode ranges from approximately 20° to approximately 25°.

3. The touch panel according to claim 1, wherein:
the first sub-electrode and the second sub-electrode are on a same side with respect to a straight line passing through an intersection of the first touch electrode and the second touch electrode and extending in the extension direction of the first touch electrode.

4. The touch panel according to claim 1, wherein:
the second sub-electrode has a same shape as the first sub-electrode, and
the second sub-electrode and the first sub-electrode are symmetrically arranged with respect to a symmetry axis passing through an intersection of the first touch electrode and the second touch electrode and extending in a direction in which the second touch electrode is arranged.

5. A touch panel, comprising:
a substrate;
a first touch electrode disposed over the substrate and including a first sub-electrode and a second sub-electrode electrically coupled to each other, wherein:
the first sub-electrode and the second sub-electrode are arranged in an extension direction of the first touch electrode,
the first sub-electrode includes a first strip-shaped electrode,
the second sub-electrode includes a second strip-shaped electrode, and
an angle between an extension direction of the first strip-shaped electrode and an extension direction of the second strip-shaped electrode is non-zero; and
a second touch electrode disposed over the substrate and intersecting the first touch electrode,
wherein:
the second touch electrode includes a third sub-electrode and a fourth sub-electrode electrically coupled to each other, the third sub-electrode and the fourth sub-electrode being arranged in an extension direction of the second touch electrode and located on two sides of the first touch electrode, respectively, the third sub-electrode includes a third strip-shaped electrode, the fourth sub-electrode includes a fourth strip-shaped electrode, an angle between an extension direction of the third strip-shaped electrode and an extension direction of the fourth strip-shaped electrode is non-zero, an angle between the extension direction of the third strip-shaped electrode and the extension direction of the second touch electrode ranges from approximately 20° to approximately 25°, and an angle between the extension direction of the fourth strip-shaped electrode and the extension direction of the second touch electrode ranges from approximately 20° to approximately 25°.

6. The touch panel according to claim 5, wherein:
the third strip-shaped electrode and the fourth strip-shaped electrode are symmetrically arranged with respect to a symmetry axis passing through an intersection of the first touch electrode and the second touch electrode and extending in the extension direction of the second touch electrode.

7. A touch panel, comprising:
a substrate;
a first touch electrode disposed over the substrate and including a first sub-electrode and a second sub-electrode electrically coupled to each other, wherein:
the first sub-electrode and the second sub-electrode are arranged in an extension direction of the first touch electrode,
the first sub-electrode includes a first strip-shaped electrode,
the second sub-electrode includes a second strip-shaped electrode, and
an angle between an extension direction of the first strip-shaped electrode and an extension direction of the second strip-shaped electrode is non-zero; and
a second touch electrode disposed over the substrate and intersecting the first touch electrode,
the touch panel further comprising:
a plurality of dummy patterns arranged over the substrate, wherein:
the plurality of dummy patterns are electrically insulated from each other,
the plurality of dummy patterns are arranged in a same layer as the first touch electrode and the second touch electrode, and are electrically insulated from the first touch electrode and the second touch electrode,
the plurality of dummy patterns are arranged in regions not covered by the first touch electrode and the second touch electrode,
the first sub-electrode has a closed-loop shape,
the first sub-electrode further includes a third strip-shaped electrode, a fourth strip-shaped electrode, and a fifth strip-shaped electrode, the third strip-shaped electrode and the first strip-shaped electrode are symmetrically arranged with respect to a symmetry axis passing through an intersection of the first touch electrode and the second touch electrode and extending along the extension direction of the first touch electrode;

a first end of the fourth strip-shaped electrode is coupled to a first end of the first strip-shaped electrode that is closer to the second touch electrode, a second end of the fourth strip-shaped electrode is coupled to a first end of the third strip-shaped electrode that is closer to the second touch electrode, a first end of the fifth strip-shaped electrode is coupled to a second end of the first strip-shaped electrode that is further away from the second touch electrode, and a second end of the fifth strip-shaped electrode is coupled to a second end of the third strip-shaped electrode that is further away from the second touch electrode.

8. The touch panel according to claim 7, wherein:
an edge of the first touch electrode has a polyline shape;
an edge of the second touch electrode has a polyline shape;
edges of the plurality of dummy patterns have polyline shapes; and
edges of the plurality of dummy patterns match the edge of the first touch electrode and the edge of the second touch electrode to form polyline-shaped gaps.

9. The touch panel according to claim 8, wherein:
shapes of the plurality of dummy patterns include polygon shapes.

10. The touch panel according to claim 8, wherein an angle at a turning point of a polyline shaped edge of one of the dummy patterns ranges from approximately 30° to approximately 150°,
an angle at a turning point of a polyline shaped edge of the first touch electrode ranges from approximately 30° to approximately 150°, and
an angle at a turning point of a polyline shaped edge of the second touch electrode ranges from approximately 30° to approximately 150°.

11. The touch panel according to claim 1, wherein an edge of the first touch electrode has a polyline shape, and an edge of the second touch electrode has a polyline shape.

12. The touch panel according to claim 11, wherein:
an angle at a turning point of a polyline shaped edge of the first touch electrode ranges from approximately 30° to approximately 150°, and
an angle at a turning point of a polyline shaped edge of the second touch electrode ranges from approximately 30° to approximately 150°.

13. A mutual capacitive touch screen, comprising a touch panel according to claim 1.

14. A touch display device, comprising a mutual capacitive touch screen according to claim 13.

* * * * *